(12) United States Patent
Kim

(10) Patent No.: US 8,543,159 B2
(45) Date of Patent: Sep. 24, 2013

(54) MOBILE PHONE

(75) Inventor: Duhee Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 16 days.

(21) Appl. No.: 12/974,675

(22) Filed: Dec. 21, 2010

(65) Prior Publication Data

US 2011/0159919 A1    Jun. 30, 2011

(30) Foreign Application Priority Data

Dec. 21, 2009  (KR) .................. 10-2009-0128159

(51) Int. Cl.
*H04M 1/00* (2006.01)

(52) U.S. Cl.
USPC ............... 455/556.1; 455/344; 455/550.1; 455/90.3; 455/567

(58) Field of Classification Search
None
See application file for complete search history.

(56) References Cited

U.S. PATENT DOCUMENTS

| | | | | |
|---|---|---|---|---|
| 5,844,719 A * | 12/1998 | Wada | | 359/557 |
| 5,932,984 A * | 8/1999 | Murakami et al. | | 318/560 |
| 7,006,139 B2 * | 2/2006 | Ohkawara | | 348/347 |
| 7,202,905 B2 * | 4/2007 | Castaneda et al. | | 348/373 |
| 7,271,845 B2 * | 9/2007 | Aoyama et al. | | 348/552 |
| 7,468,753 B2 * | 12/2008 | Butterworth et al. | | 348/357 |
| 7,565,070 B1 * | 7/2009 | Gutierrez | | 396/75 |
| 2009/0213264 A1 * | 8/2009 | Kim | | 348/374 |
| 2009/0305695 A1 * | 12/2009 | Bear et al. | | 455/426.1 |
| 2010/0134906 A1 * | 6/2010 | Nakamura et al. | | 359/824 |

\* cited by examiner

*Primary Examiner* — Willie J Daniel, Jr.
(74) *Attorney, Agent, or Firm* — Saliwanchik, Lloyd & Eisenschenk

(57) ABSTRACT

Disclosed herein is a mobile phone. In short, a mobile terminal of the present invention includes an actuator placed inside the camera module to shift a lens of the camera module toward an upper side of an optical axis direction when a forward current is applied and shift the lens toward a lower side of an optical axis direction when a reverse current is applied, a vibration control part placed outside of the camera module to output a first control signal and a second control signal when a signal from outside is input telling of operating in a vibration mode, a vibration motor part connected to the vibration control part to vibrate the mobile phone by driving a motor when the first control signal is input, and an actuator drive part connected to the vibration control part to apply the reverse current to the actuator when the second control signal is input.

22 Claims, 3 Drawing Sheets

MOBILE PHONE

CROSS-REFERENCE TO RELATED APPLICATION

This application claims the benefit under 35 U.S.C. §119 of Korean Application No. 10-2009-0128159, filed on Dec. 21, 2009, which is hereby incorporated by reference in its entirety.

BACKGROUND OF THE DISCLOSURE

1. Field of the Invention

The present invention relates to a mobile phone installed with a camera module.

2. Discussion of the Related Art

Concomitant with the development of recent communication and digital information processing technologies, a mobile phone technique integrated with information processing and computations, communications, and image information input/output has newly emerged.

Consistent with this, a mobile phone merged with a camera function has commercialized, at which system the mobile phone installed with a camera module photographs and stores moving images and still images and transfers them to the other party.

A mobile phone installed with such a camera module simply does not remain in a function of shooting an object, but is actually in a stage of adding an accessory function like a focus function of adjusting a focus of objects to be shot and a zoom function of making an object in the distance appear a near-sight or a close positioned object coming into a far distance.

A conventional lens unit of a camera module moves upward/downward along with an optical axis by a VCM (Voice Coil Motor), and through such an action, a camera module can do an auto focusing of a focal point of an object.

At this time, an upper part and a lower part of a lens unit is installed with an upper spring and an lower spring, and in a case a force applied to a lens part by a voice coil motor is greater than tension of a spring, a lens unit moves in an optical axis direction.

A camera module-installed mobile phone may operate in "vibration mode" vibrating by drive of a vibration motor, where a spring supporting a lens unit may rock simultaneously when a mobile phone is trembling due to a vibration mode.

When a spring supporting a lens unit rocks, so does a lens unit, whereby a banging sound occurs in a vibration mode as the lens unit touches a bottom surface.

BRIEF SUMMARY

The present invention provides a mobile phone installed with a camera module configured to inhibit a thud noise occurring due to a lens unit in a vibration mode of a mobile phone.

According to one general aspect of the present invention, a mobile phone installed with a camera module is provided, the mobile terminal including an actuator placed inside the camera module to shift a lens of the camera module toward an upper side of an optical axis direction when a forward current is applied and shift the lens toward a lower side of an optical axis direction when a reverse current is applied, a vibration control part placed outside of the camera module to output a first control signal and a second control signal when a signal from outside is inputted telling of operating in a vibration mode, a vibration motor part connected to the vibration control part to vibrate the mobile phone by driving a motor when the first control signal is inputted, and an actuator drive part connected to the vibration control part to apply the reverse current to the actuator when the second control signal is inputted.

An embodiment of the invention applies a reverse current to an actuator driving a lens unit of a camera module and thus extremely pushes a lens unit onto a tension member placed at a lower part, so that a banging sound occurring by movement of a lens unit in a vibration mode can be inhibited.

In addition, the present invention provides a mobile phone including, an actuator moving a lens; a vibration control unit outputting a first control signal and a second control signal; a vibration motor unit vibrating the mobile phone by driving a motor, when the first control signal is input, connected to the vibration control unit; and an actuator drive part applying the current to the actuator when the second control signal is input, connected to the vibration control unit.

DETAILED DESCRIPTION

Figure 1:
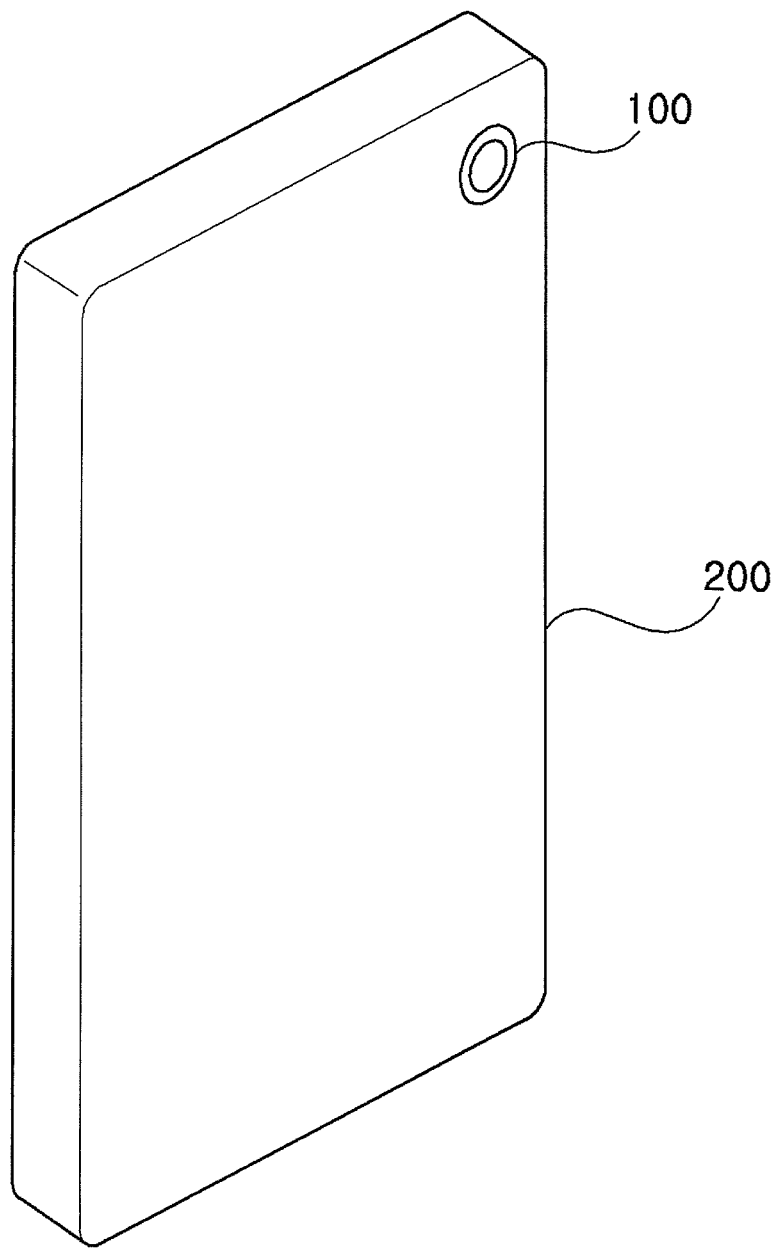
FIG. 1 is an outer shape diagram of a mobile phone according to an embodiment of the present invention.

Since the present invention can be applied with various changes thereto and several types of embodiments, specific embodiments intend to be exemplified in the drawings and minutely described in the detailed description. However, it should not be appreciated in a limiting sense of limiting the present invention to a specific example but to include all the changes, equivalents and replacements which fall in the spirit and technical scope of the present invention.

While terms including ordinal numbers such as a first and a second may be used to describe various components, such components are not limited to the terms. The terms are used only for the purpose of distinguishing one component from other components.

For example, a second component may be named as a first component without departing from the scope of the present invention rights, and in a similar way, the first component may be renamed as the second component.

Stated that any component is "connected" or "conjunctive" to another component, it will be appreciated to be directly connected or conjunctive to the very another component or otherwise that there exists any component in the midst of them. On the other hand, stating that any component is "directly connected" or "directly conjunctive" to another component, it should be understood that any other component does not exist therebetween.

Terms used in the present application are only used to describe a specific embodiment, not in a sense of limiting the invention. A singular form includes a plural form, otherwise stated in a different way in the context. In this application, the terms such as "include" or "have" indicate that there exist a characteristic, a number, a step, an operation, a component, other things recited in the specification or a combination thereof, but it should not be understood to preclude the existence or addition of one or more other characteristics, numbers, operations, substances, components or a combination of thereof.

In the following, a mobile phone according to an embodiment of the present invention will be described in detail referring to the attached drawings, but without regard to a drawing sign, an identical or corresponding component is assigned the same reference numeral and a redundant description regarding this will be omitted.

FIG. 1 is an outer shape diagram of a mobile phone according to the present invention.

As shown in FIG. 1, a mobile phone includes a main body 200 and a camera module 100 mounted at a setting position of the main body 200.

Figure 2:
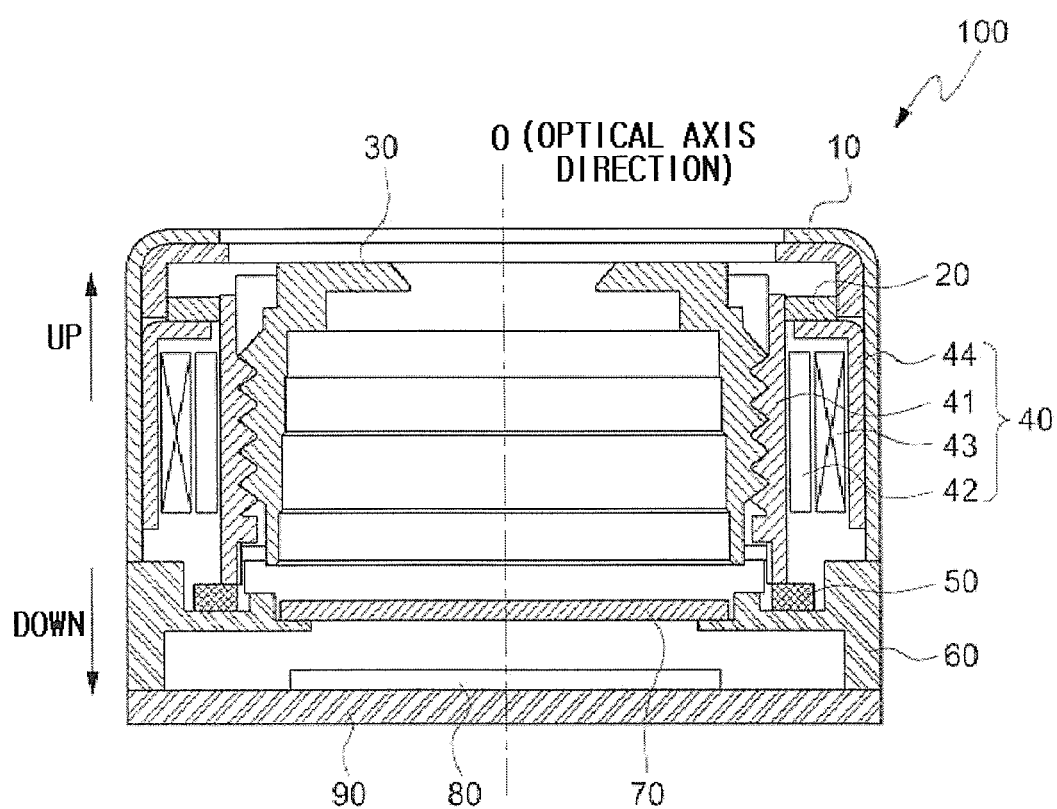
FIG. 2 is a cross-section view of a camera module according to an embodiment of the present invention.

FIG. 2 is a cross-sectional view of a camera module 100 according to an embodiment of the invention.

As shown in FIG. 2, a camera module 200 of the present invention includes a case 10, an upper part tension member 20, a lens barrel 30, an actuator 40, a lower part tension member 50, a frame 60, an IR filter 70, an image sensor 80 and a printed circuit board 90.

For auto focusing, an actuator 40, that is an operating unit shifting a lens barrel 30 along with an optical axis direction O, is necessary, in which the present invention is a voice coil motor among actuators 40.

An actuator 40 includes a bobbin 41, a coil 42, a permanent magnet 43, and a yoke 44.

A case 10 has a cubical form with its lower part opened, and an upper part central side is formed with a light penetration hole 11. A lower part of a case 10 is supported by a frame 60.

The case 10 is coupled with a frame 60 to form a frame 60, and the space includes an upper part tension member 20, a lens barrel 30, an actuator 40, and an IR filter 50.

It is preferred that a case 10 is manufactured with plastic for an insulation between its inner part and outer part, and an injection molding for mass production is possible.

An upper part tension member 20 is a plate spring, being inserted into an upper part of a case 10, and its outside part is supported by a yoke 44 of an actuator 40, and its inside part faces a bobbin 41 of an actuator 40 and applies pressure to an upper side of a bobbin 41.

A lower part tension member 50 may be into an insert injection at a bobbin 41, and may be pasted with a bond.

A lens barrel 30 is a means of fixing and protecting a plurality of lenses, an inner side of a lens barrel 30 is stacked with a plurality of lens capable of inputting a light image of a subject sequentially according to an optical axis direction O.

A surrounding surface of a lens barrel 30 is formed of a screw thread 31, and the screw thread 31 is screw-coupled to a screw thread formed at an inner-rim surface of a bobbin 41.

The bobbin 41 is of a cylindrical shape with its upper part and lower part opened, and the inner-rim surface is formed with a screw thread corresponding to a screw thread 31 of a lens barrel 30. The present invention may take the far distance focusing of a camera module by screw-coupling a lens barrel 30 to an inner-rim surface of a bobbin 41.

A surrounding part of a bobbin 41 is wound perpendicular to the direction of magnetic flux by a coil 42 interacting with a permanent magnet 43.

An inner side of a case 10 is inserted with a yoke 44 for keeping magnetic field between a coil 42 and a permanent magnet 43 from leaking from outside, and a permanent magnet 43 is mounted at an inner side of a yoke 44 to face each other based on a bobbin 41. The yoke 44 is supported by a frame 60.

When a voltage is applied to a coil 42, current flowing through the coil and magnetic field of a permanent magnet 43 interact (Fleming's left-hand rule), and thus a bobbin 41 is inflicted with a force towards an upper side of an optical axis direction. At this time, the greater the intensity of current applied to the coil 42 is, a distance a lens barrel 30 and a bobbin 41 shift to an upper part along an optical axis direction increases.

Successively, when a voltage applied to a coil 42 is blocked, a lens barrel 30 and a bobbin 41 shift to a lower part along with an optical axis direction by an upper part tension member 20 and a lower part tension member 50 and return to its original state.

A printed circuit board 90 is mounted with an image sensor 80 transforming a light image into an electrical signal, and a frame 60 is a rectangular shape having a central opening part that can penetrate a light to an image sensor 80, and the frame 60 is positioned at a lower part of a lens barrel 30, and mounted with an IR filter 70 filtering infrared.

An image sensor 80 is placed at a lower part of a lens barrel 30 and at an upper part of a printed circuit board 90, and transforms a light image incident through a plurality of lens into an electrical signal.

The printed circuit board 90 is an FPCB (Flexible Printed Circuit Board) having a high evenness level, an outwardly extended part from an FPCB is provided with means connected to an external device (not shown).

As described above, a lens barrel 30 of the present invention is supported by elasticity force between an upper part tension member 20 and a lower part tension member 50.

Figure 3:
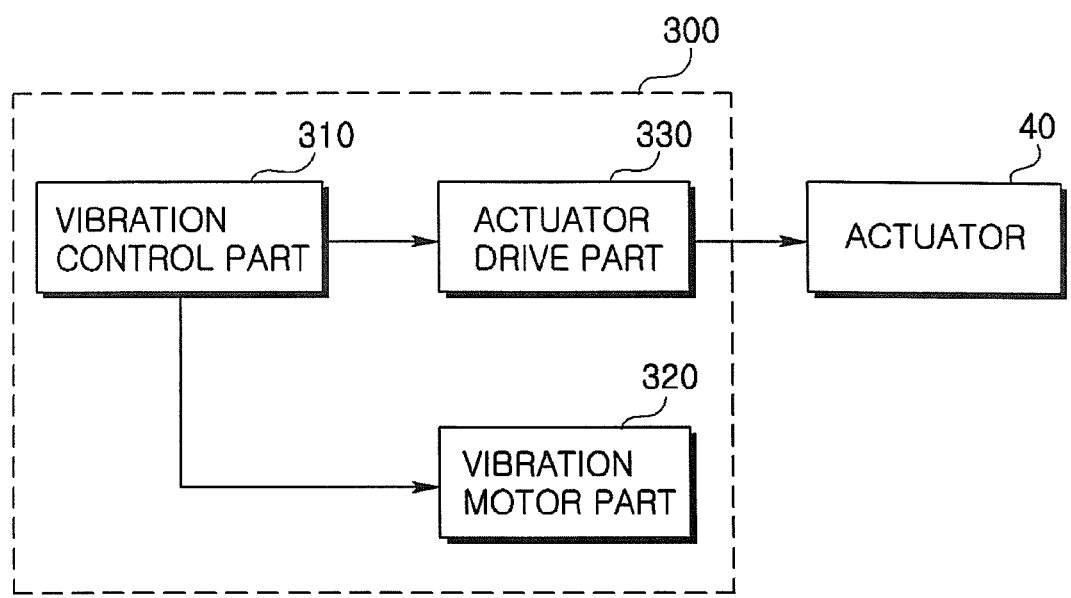
FIG. 3 is a schematic construction diagram of a central control unit and an actuator of a mobile phone according to an embodiment of the invention.

FIG. 3 is a schematic construction view of a central control part 300 and an actuator 40 of a mobile phone according to an embodiment of the invention.

As illustrated in FIG. 3, a central control part 300 of a mobile phone of the invention includes a vibration control part 310 controlling vibration of a mobile phone, a vibration motor part 320 receiving an electric source voltage according to a control signal of the vibration control part 310 and driving a mobile phone in a vibration mode, and an actuator drive part 330 driving the actuator 40 of a camera module.

The vibration control part 310 processes a signal input from an external and determines if a mobile phone should be operated in a vibration mode, and if a mobile phone needs to be operated in a vibration mode, outputs a first control signal to the vibration motor part 320.

Then, the vibration motor part 320 drives a motor so that a mobile phone vibrates according to a first control signal.

If a signal telling of operating in a vibration mode from outside is input like in the case of a vibration mode when a call is terminated or in a case a user manipulates a keypad to convert a bell mode into a vibration mode, a vibration control part 310 outputs a first control signal and a second control signal informing of a vibration mode initiation to a vibration motor part 320 and an actuator drive part 330, respectively.

An actuator drive part 330 applies "forward current" to the coil 42 of an actuator 40 at the time of auto focusing action, but if a second control signal from the vibration control part 310 is input, it applies "reverse current" to the coil 42 of an actuator 40.

If a reverse current is applied to the coil 42, a bobbin 41 of an actuator 40 is inflicted with a force toward a lower side of an optical axis direction by Fleming's left-hand rule. Then, a lens barrel 30 including a lens unit connected to a bobbin 41 is maximally pushed to a lower part tension member 50, thereby presumably inhibiting a banging sound occurring according to the falter of a lens unit in a vibration mode of a mobile phone.

A circuit of applying a forward current and a reverse current to the actuator 40 may be variously realized, and a related specific description will be omitted.

The vibration control part 310 may output simultaneously a first control signal and a second control signal, but it may output a first control signal a pre-defined time after a second control signal is outputted.

A vibration control part 310 of the present invention may set a certain time interval while a second control signal is output and afterwards a first control signal is output, so that a vibration mode after a lens barrel 30 is maximally pushed to a lower part tension member 50 may be initiated and a banging sound occurring according to the falter of a lens unit may be inhibited.

At this time, a certain time interval is a time required so that a lens barrel 30 closely couples to a lower part tension member 50.

While the present invention has been described in detail through representative embodiments in the above part, those skilled in the art would understand that various modifications can be made in the described embodiment without departing from the scope of the present invention.

What is claimed is:

1. A mobile phone including a camera module, composing:
    a vibration control part configured to output a first control signal for vibrating the mobile phone and a second control signal for driving an actuator when the mobile phone is operated in a vibration mode:
    a vibration motor part configured to vibrate the mobile phone by driving a motor in response to the first control signal;
    the actuator drive part configured to drive the actuator in response to the second control signal; and
    an actuator placed inside the camera module configured to perform an auto focusing function by applying a forward current to a coil and to perform moving and fixing a bobbin including a lens toward a lower side of an optical-axis direction by applying a reverse current to the coil in response to the second control signal.

2. The mobile phone of claim 1, wherein the vibration control part simultaneously outputs the first control signal and the second control signal.

3. The mobile phone of claim 1, wherein the vibration control unit outputs the first control signal after the second control signal is output.

4. The mobile phone of claim 1, wherein the actuator drive part applies the forward current to the actuator in an auto focusing mode.

5. The mobile phone of claim 4, wherein the actuator drive part applies a reverse current to the actuator in the vibration mode.

6. A mobile phone comprising:
    a vibration control unit outputting a first control signal for vibrating the mobile phone and a second control signal for driving the actuator;
    a vibration motor unit configured to vibrate the mobile phone by driving a motor of the mobile phone when the first control signal is inputted; and
    an actuator drive part configured to apply a reverse current to an actuator when the second control signal is inputted; and
    where the actuator is placed inside a camera module of the mobile phone and configured to perform auto focusing function by applying a forward current to a coil and to perform fixing a bobbin by applying a reverse current to the coil in response to the second control signal such that the actuator reverses moving direction of the lens and the lens moves only toward a lower side of an optical-axis direction.

7. The mobile phone of claim 6, wherein the upper elastic member and the lower elastic member include plate springs.

8. The mobile phone of claim 6, wherein after the actuator drive part fixes the bobbin to the lower elastic member, the vibration motor unit vibrates the mobile phone by driving a motor of the mobile phone in response to the first control signal.

9. The mobile phone of claim 8, wherein the actuator comprises:
    the bobbin having a screw thread coupling to a thread of a lens barrel;
    a coil coupled to the bobbin;
    a permanent magnet facing the coil; and
    a yoke.

10. The mobile phone of claim 9, wherein the yoke is placed inside a case.

11. The mobile phone of claim 6, wherein the actuator includes a voice coil motor.

12. The mobile phone of claim 6, wherein the first control signal is outputted after the second control signal is outputted.

13. The mobile phone of claim 6, wherein the vibration control unit simultaneously outputs the first control signal and the second control signal.

14. The mobile phone of claim 6, wherein the actuator drive part applies a forward current to the actuator in an auto-focusing mode.

15. The mobile phone of claim 14, wherein the actuator drive part applies a reverse current to the actuator in a vibration mode.

16. The mobile phone of claim 6, wherein the actuator drive part applies the forward current to the actuator in an auto-focusing mode and the actuator drive part applies the reverse current to the actuator in a vibration mode.

17. The mobile phone of claim 6, wherein the vibration control unit outputs the first control signal and the second control signal when the mobile phone is to operate in a vibration mode.

18. The mobile phone of claim 6, wherein the actuator is placed at a case inner side of the camera module.

19. The mobile phone of claim 18, wherein the lens is placed at a case outer side of the camera module.

20. The mobile phone of claim 18, wherein the actuator moves a lens barrel along all optic-axis direction.

21. The mobile phone of claim 20, wherein the actuator includes an upper part elastic member pressurizing an upper side of the bobbin and a lower part elastic member pressurizing a lower side of the bobbin.

22. The mobile phone of claim 21, wherein the actuator drive part closely fixes the bobbin to the lower part elastic member through the second control signal.

* * * * *